2,926,188
PROCESS FOR PREPARING α-CYANOACRYLATES

Charles H. McKeever, Meadowbrook, and Harry R. Raterink, Drexel Hill, Pa., assignors to Rohm & Haas Company, Philadelphia, Pa., a corporation of Delaware No Drawing. Application May 6, 1957
Serial No. 657,039

8 Claims. (Cl. 260—465.4)

This invention concerns a method for preparing lower alkyl α-cyanoacrylates, particularly methyl α-cyanoacrylate.

In the preparation of alkyl α-cyanoacrylates as heretofore carried out there has been considerable variation in the characteristics of the product. In a usual method of reacting about one mole of formaldehyde with one mole of an alkyl cyanoacetate a low polymer forms together with water. The two are separated by any convenient method. Even the low polymer may be well dried, there results an unstable monomer when the polymer is thermally cracked.

A method has now been found for avoiding the formation of the low polymer and in so doing there is obtained an intermediate from which relatively pure alkyl α-cyanoacrylate can be readily obtained. The method comprises reacting a lower alkyl cyanoacetate and formaldehyde in a role ratio of about 2:1, whereby there is formed 1,3-dicyano-1,3-bis(alkoxycarbonyl)propane and water, drying the reaction product, then heating to pot temperatures between about 150°–210° C. at reduced pressure, and distilling off alkyl α-cyanoacrylate and recovering alkyl cyanoacetate.

This method has the advantages of avoiding formation of polymer, working with a non-viscous reaction mixture, cracking an intermediate which is free of any hydroxyl group which might be a source of water in the desired final product, and thus providing a pure, uniform final product.

The lower alkyl α-cyanoacrylates that may be prepared by the method of the present method include the methyl, ethyl, propyl, isopropyl, butyl, isobutyl, and tert-butyl members.

Formaldehyde may be used as an aqueous or an alcoholic solution, the water or alcohol being removed from the subsequent reaction mixture, as by a conventional method. The formaldehyde may also be supplied as a gas or from a revertible polymer.

Reaction of formaldehyde and lower alkyl cyanoacetate may be accelerated by use of a small proportion, such as 0.01% to about 0.1% by weight based on the alkyl cyanoacetate of an alkaline catalyst. There may be used an alkali metal hydroxide or an amine, or an amine salt of a carboxylic acid. Typical amines for use as catalysts include piperidine, pyrrolidine, morpholine, ethylamine, butylamine, dimethylamine, pyridine, ethanolamine, dimethylethanolamine, triethanolamine. The acetate salts of amines have been found to be quite as effective as the free amines and may have the advantage of being more readily handled in some cases. The catalyst may be neutralized with an acid, such as hydrochloric, after the formation of the 1,3-dicyano-1,3-bis(alkoxycarbonyl)propane, as desired.

The reaction of formaldehyde and alkyl cyanoacetate is carried out by mixing the two reactants in any order but in about the molar ratio of one mole of formaldehyde to two of alkyl cyanoacetate and heating the mixture between about 50° and 100° C. until the formaldehyde is consumed.

Water is now removed from the reaction mixture. This may be done by allowing a water-layer to form and separating it. Water may be taken up by conventional drying agents, such as calcium sulfate, magnesium sulfate, or sodium sulfate and such agents may also be added to the organic layer after any water layer has been separated. Water may be distilled off by the usual azeotropic mixtures with solvents, such as benzene, toluene, or naphthas. Or, water may be distilled off readily under reduced pressure. Final traces of moisture may be conveniently disposed of with a little phosphorus pentoxide, if this should be desired.

The condensation product of two moles of alkyl cyanoacetate and one mole of formaldehyde may now be heated under reduced pressure, if it is desired to purify this product. At pressures below about 4 mm. this product can be distilled as such. This step is useful when a particularly pure alkyl α-cyanoacrylate is desired.

The condensation product, either as separated or as purified, is now heated to a cracking temperature, that is one at which an alkyl α-cyanoacrylate is formed, preferably in the range of about 150° to 210° C. at reduced pressures of about 4 to 50 mm. of mercury. The alkyl α-cyanoacrylate and alkyl cyanoacetate are distilled off at pressures of 4 to 50 mm. These products are then fractionally distilled, the alkyl cyanoacetate being recovered as the higher boiling fraction. The alkyl cyanoacetate is, of course, desirably recycled.

It is possible and frequently desirable in order to obtain and keep the lower alkyl α-cyanoacrylate product in a favorable state to add to the freshly distilled ester a stabilizer and also a polymerization inhibitor in order to guard against anionic or free-radical polymerization or both. Such an inhibitor may also be added to the reaction mixture containing 1,3-dicyano-1,3-bis(alkoxycarbonyl)propane before it is heated to the cracking temperature.

Useful stabilizers include phosphorus pentoxide; acetic or propionic anhydride; anhydrous carboxylic acids, such as acetic acid, acrylic acid, methacrylic acid, and itaconic acid; boron trifluoride complexes with ethers, carboxylic acids, ketones, and other oxygenated organic compounds; and stannic chloride, ferric chloride, and other members of the class of Lewis acids. Effective inhibitors include hydroquinone and its methyl ether, pyrogallol, and di-β-naphthol.

In conducting the step of cracking the 1,3-dicyano-1,3-bis(alkoxycarbonyl)propane, it is sometimes desirable, in order to maximize yields of desired stable monomer, to use equipment that has been heated to remove residual moisture. There may also be employed a small amount of a conventional drying agent, such as phosphorus pentoxide, to help dispose of traces of moisture from apparatus walls or any moisture picked up during the handling of the reaction mixture.

The method of this invention may be more fully understood from the following examples which are offered by way of illustration and not by way of limitation. Parts by weight are used throughout.

Example 1

There are introduced into a reaction vessel, equipped with a stirrer, reflux condenser, and thermometer, 99.1 parts of methyl cyanoacetate and 13.5 parts of paraformaldehyde. The mixture is heated to 90° C. and then 0.3 part of methanolic 10% potassium hydroxide is added. An exothermic heat of reaction is noticed and the temperature of the system rises to about 120° C. The paraformaldehyde dissolves completely. The reaction system is cooled to 90° to 95° C. and held at this temperature for two and one-half hours. There is then added one part of concentrated hydrochloric acid. The reaction mixture is distilled under reduced pressure and there is collected at 145° to 165° C. at 1.0 to 1.4 mm. absolute pressure 72 parts of the compound $CH_2[CH(CN)COOCH_3]_2$, which may be named 1,3-dicyano-1,3-bis(methoxycarbonyl)propane. On standing, the 1,3-dicyano-1,3-bis(methoxycarbonyl)propane solidifies and melts at 47° to 48° C. The analyses reveal 51.65% carbon (51.40% theoretical), 4.67% hydrogen (4.76% theoretical), 13.14% nitrogen (13.33% theoretical), and a saponification number of 516 (533 theoretical).

There are added to a clean dry flask, which has been previously washed with dilute sulfuric acid, 70 parts of 1,3-dicyano-1,3-bis(methoxycarbonyl)propane. Attached to the flask is a condenser and a receiver containing a trace of phosphorus pentoxide, both of which have been washed with dilute sulfuric acid and thoroughly dried. The system is purged with dry nitrogen. The flask and its contents are heated and the pressure of the system is reduced to 10 to 20 mm. absolute pressure. When the pot temperature reaches about 175° C. cracking is observed which continues to a pot temperature of about 210° C. The corresponding vapor temperature is 105° to 150° C. The product distills at 47° to 49° C. at 1.8 mm. absolute pressure and is collected in good yield. The product is identified as methyl α-cyanoacrylate. After distillation of the product there distills methyl cyanoacetate at 60° to 65° C. at 1.8 mm. absolute pressure. The methyl α-cyanoacrylate may be polymerized to a hard, clear, colorless coating using a free radical or anionic polymerization initiator.

In a similar manner there is prepared butyl α-cyanoacrylate by first reacting two equivalents of butyl cyanoacetate with one equivalent of formaldehyde in the presence of piperidine and then cracking the resulting compound to give butyl α-cyanoacrylate and butyl cyanoacetate.

*Example 2*

To a reaction vessel there are introduced 396.4 parts of methyl cyanoacetate and 16 parts of paraformaldehyde. The mixture is heated to 86° C. and 1.2 parts of methanolic 10% potassium hydroxide is added. An immediate exothermic heat of reaction is noticed and the temperature rises to 100° C. When the heat of reaction subsides, 54 parts of paraformaldehyde is added in small portions over a period of 30 minutes. The mixture is held at 90° to 100° C. for five hours. The catalyst is then neutralized with three parts of hydrochloric acid. The reaction mixture is stripped to a pot temperature of 150° C. at 1.5 mm. absolute pressure leaving 345 parts of 1,3-dicyano-1,3-bis(methoxycarbonyl)propane.

There are charged to a clean, dry, acid-washed flask 170 parts of 1,3-dicyano-1,3-bis(methoxycarbonyl)propane, three parts of phosphorus pentoxide, and one part of pyrogallol. The system is flushed with dry nitrogen and the reaction mixture is heated to a pot temperature of 170° to 210° C. (corresponding vapor temperature 110° to 170° C.) at 30 to 35 mm. absolute pressure. Distillate is taken and product (150 parts) is collected and identified as a mixture of approximately equal amounts of monomeric methyl α-cyanoacrylate and methyl cyanoacetate.

Another portion of 1,3-dicyano-1,3-bis(methoxycarbonyl)propane is cracked at 4 mm. absolute pressure at a pot temperature of 150° to 200° C. and corresponding vapor temperature of 95° to 145° C. with distillate being collected. Small amounts of phosphorus pentoxide and pyrogallol are added to this distillate and it is then fractionated. Methyl α-cyanoacrylate is collected at 47° to 49° C. at 1.8 mm. absolute pressure and methyl cyanoacetate is collected at 55° to 65° C. at 1.7 mm. absolute pressure.

In like manner, two equivalents of ethyl cyanoacetate are reacted with one equivalent of formaldehyde to form 1,3-dicyano-1,3-bis(ethoxycarbonyl)propane which is cracked to give ethyl α-cyanoacrylate and ethyl cyanoacetate.

The method of this invention has a number of advantages over previously known methods of preparing alkyl α-cyanoacrylates. In the first place it avoids the preparation of the methylol compound with its hydroxyl group which promotes formation of polymers of the α-cyanoacrylate. Then a compound is formed which is capable of purification by distillation at low pressures and thus permits isolation of a definite intermediate rather than formation of a polymer which heretofore has been terminated with a hydroxyl-bearing group from which water can be derived during cracking of the polymer. Furthermore, since polymer formation is avoided, the thick, viscous reaction mixtures need not be handled, but rather a fluid system to which no added fluidizing agent need be added, as is common practice during cracking of such low polymers.

We claim:

1. A process for preparing stable monomeric lower alkyl α-cyanoacrylates employing substantially anhydrous conditions throughout which comprises reacting substantially two molecular equivalents of lower alkyl cyanoacetate with substantially one molecular equivalent of formaldehyde, said cyanoacetate always being present in the reaction medium in at least a 2 to 1 molecular ratio with respect to said formaldehyde, heating the resulting compound at about 150° to 210° C. at about 4 to 50 mm. absolute pressure whereby lower alkyl α-cyanoacrylate and alkyl cyanoacetate are formed and collecting the lower alkyl α-cyanoacrylate, in which said alkyl group contains from 1 to 4 carbon atoms.

2. A process for preparing stable monomeric lower alkyl α-cyanoacrylates employing substantially anhydrous conditions throughout which comprises reacting substantially two molecular equivalents of lower alkyl cyanoacetate with substantially one molecular equivalent of formaldehyde in the presence of an alkaline catalyst in an amount of about 0.01% to 0.1% by weight of the lower alkyl cyanoacetate, said cyanoacetate always being present in the reaction medium in at least a 2 to 1 molecular ratio with respect to said formaldehyde, heating the resulting compound at about 150° to 210° C. whereby lower alkyl α-cyanoacrylate and alkyl cyanoacetate are formed and distilling off lower alkyl α-cyanoacrylate at reduced pressure, in which said alkyl group contains from 1 to 4 carbon atoms.

3. A process for preparing stable monomeric lower alkyl α-cyanoacrylates employing substantially anhydrous conditions throughout which comprises reacting substantially two molecular equivalents of lower alkyl cyanoacetate with substantially one molecular equivalent of formaldehyde, said cyanoacetate always being present in the reaction medium in at least a 2 to 1 molecular ratio with respect to said formaldehyde, heating the resulting compound at about 150° to 210° C. at about 4 to 50 mm. absolute pressure, whereby alkyl α-cyanoacrylate and alkyl cyanoacetate are formed, collecting substantially equimolecular proportions of lower alkyl α-cyanoacrylate and lower alkyl cyanoacetate, and separating said α-cyanoacrylate from said cyanoacetate, in which said alkyl group contains from 1 to 4 carbon atoms.

4. A process for preparing stable monomeric methyl α-cyanoacrylate employing substantially anhydrous conditions throughout which comprises reacting substantially two molecular equivalents of methyl cyanoacetate with substantially one molecular equivalent of formaldehyde, said cyanoacetate always being present in the reaction medium in at least a 2 to 1 molecular ratio with respect to said formaldehyde, heating the resulting compound at about 150° to 210° C. at about 4 to 50 mm.

absolute pressure whereby methyl α-cyanoacrylate is formed and collecting methyl α-cyanoacrylate.

5. A process for preparing stable monomeric methyl α-cyanoacrylate employing substantially anhydrous conditions throughout which comprises reacting substantially two molecular equivalents of methyl cyanoacetate with substantially one molecular equivalent of formaldehyde in the presence of an alkaline catalyst in an amount of about 0.01% to 0.1% by weight of the methyl cyanoacetate, said cyanoacetate always being present in the reaction medium in at least a 2 to 1 molecular ratio with respect to said formaldehyde, heating the resulting compound at about 150° to 210° C. at about 4 to 50 mm. absolute pressure whereby methyl α-cyanoacrylate is formed and collecting methyl α-cyanoacrylate.

6. A process for preparing stable monomeric methyl α-cyanoacrylate employing substantially anhydrous conditions throughout which comprises reacting substantially two molecular equivalents of methyl cyanoacetate with substantially one molecular equivalent of formaldehyde in the presence of an alkaline catalyst in an amount of about 0.01% to 0.1% by weight of the methyl cyanoacetate, said cyanoacetate always being present in the reaction medium in at least a 2 to 1 molecular ratio with respect to said formaldehyde, heating the resulting compound at about 150° to 210° C. at about 4 to 50 mm. absolute pressure, whereby methyl α-cyanoacrylate and methyl cyanoacetate are formed, collecting substantially equimolecular proportions of methyl α-cyanoacrylate and methyl cyanoacetate, and separating methyl α-cyanoacrylate from methyl cyanoacetate.

7. A process for preparing stable monomeric lower alkyl α-cyanoacrylates employing substantially anhydrous conditions throughout which comprises reacting substantially two molecular equivalents of lower alkyl cyanoacetate with substantially one molecular equivalent of formaldehyde to form a 1,3-dicyano-1,3-bis(alkoxycarbonyl)propane, said cyanoacetate always being present in the reaction medium in at least a 2 to 1 molecular ratio with respect to said formaldehyde, isolating and then heating said propane compound at about 150° to 210° C. at absolute pressures of about 4 to 50 mm., whereby alkyl α-cyanoacrylate and alkyl cyanoacetate are formed, collecting substantially equimolecular proportions of lower alkyl α-cyanoacrylate and lower alkyl cyanoacetate, and separating said α-cyanoacrylate from said cyanoacetate, in which said alkyl group contains from 1 to 4 carbon atoms.

8. A process for preparing stable monomeric methyl α-cyanoacrylate employing substantially anhydrous conditions throughout which comprises reacting substantially two molecular equivalents of methyl cyanoacetate with substantially one molecular equivalent of formaldehyde in the presence of an alkaline catalyst in an amount of about 0.01% to 0.1% by weight of the methyl cyanoacetate to form a 1,3-dicyano-1,3-bis(methoxycarbonyl)propane, said cyanoacetate always being present in the reaction medium in at least a 2 to 1 molecular ratio with respect to said formaldehyde, isolating and then heating said propane compound at about 150° to 210° C. at absolute pressures of about 4 to 50 mm., whereby methyl α-cyanoacrylate and methyl cyanoacetate are formed, collecting substantially equimolecular proportions of methyl α-cyanoacrylate and methyl cyanoacetate, and separating methyl α-cyanoacrylate from methyl cyanoacetate.

References Cited in the file of this patent

UNITED STATES PATENTS

| | | |
|---|---|---|
| 2,467,926 | Ardis | Apr. 19, 1949 |
| 2,467,927 | Ardis | Apr. 19, 1949 |
| 2,721,858 | Joyner et al. | Oct. 25, 1955 |
| 2,776,232 | Shearer et al. | Jan. 1, 1957 |